Patented May 3, 1938

2,115,708

UNITED STATES PATENT OFFICE 2,115,708

COMPOSITION OF MATTER CONTAINING CELLULOSE DERIVATIVES

Henry Dreyfus, London, England

No Drawing. Application February 8, 1934, Serial No. 710,346. In Great Britain February 17, 1933

11 Claims. (Cl. 106—40)

This invention relates to the manufacture of products made of or containing derivatives of cellulose, synthetic resins and other plasticizable substances, and particularly to the manufacture and application of a new class of plasticizer.

The plasticizers of the present invention are unsymmetrical and other esters of polycarboxylic acids containing at least one substituted or unsubstituted residue of a dihydric alcohol or derivative thereof, excluding the symmetrical esters of such acids with unsubstituted glycols. The term "polycarboxylic acid" is used here to denote acids containing more than one carboxyl group and the term "residue of a dihydric alcohol" to denote the residue obtained by removing one hydroxy group from a dihydric alcohol in which one or more of the hydrogen atoms may or may not be substituted for example by alkyl groups or halogen atoms.

The esters of the invention are new chemical substances and the invention includes their production and the esters themselves.

The acids of which the new esters are derivatives may be cyclic compounds, for example phthalic acid and its halogen or alkyl substitution products, or acyclic compounds, e. g. malonic, glutaric, succinic and tartaric acids and their substitution products.

The esters may contain in addition to the free or etherified dihydric alcohol residue a hydrocarbon residue, especially a methyl group, or a different dihydric alcohol residue in which the hydroxy group may or may not be etherified or esterified. Thus among esters containing a hydrocarbon group in addition to the dihydric alcohol residue are the alkyl hydroxy-alkyl series, especially the methyl-hydroxy-alkyl series and compounds in which the alkyl group contains a considerable number, for example 6 or more carbon atoms, and the alkyl alkoxy-alkyl series. Among those containing two dihydric alcohol residues are those containing two similarly constituted derivatives of different dihydric alcohols, e. g. two different hydroxy-alkyl or alkoxy-alkyl groups, and those containing two differently constituted groups which may or may not be derivatives of the same dihydric alcohol, e. g. hydroxy-alkyl alkoxy-alkyl, acidyl-hydroxy-alkyl alkoxy-alkyl and hydroxy-alkyl acidyl-hydroxy-alkyl, hydroxy-alkyl alkyl-carboxy-alkyl and alkoxy-alkyl alkyl-carboxy-alkyl esters.

The esters may contain substituted cyclic, for example benzoid, groups as well as substituted alkyl groups. Thus for example the esters may be derivatives of halogenated phthalic acids. The presence of halogens in such compounds in general tends to increase their resistance to fire, a property which is of considerable value in compositions containing inflammable substances such as nitrocellulose.

Some general methods for producing the esters of the invention are the following: by effecting reaction between substituted or unsubstituted glycols (or di- or polyglycols) or mono-ethers thereof and polycarboxylic acids or their anhydrides in presence or absence of catalysts such for example as sulphuric acid, or between olefine oxides and polycarboxylic acids; between halohydrins or derivatives thereof and salts, for example the sodium or silver salts or polycarboxylic acids or their acid esters; between mono-halogen-alkyl ethers and salts of mono-esters of polycarboxylic acids; or between salts of acid esters of polycarboxylic acids, containing free or etherified dihydric alcohol residues, and esters of halogenated fatty acids, or by the hydrolysis of phthalic acid esters containing esterified dihydric alcohol residues, or of mixed esters containing a dihydric alcohol residue and a more easily removed esterifying group.

The following are some typical phthalic acid esters of the new class and methods for their production; mono-(β-hydroxyethyl) phthalate, produced from phthalic anhydride and glycol; mono-(β-ethoxyethyl) phthalate, produced from phthalic anhydride and β-hydroxyethyl ether; methyl-(β-hydroxy-ethyl) phthalate, from sodium methyl phthalate and ethylene chlorhydrin, or from mono-(β-hydroxyethyl) phthalate and methyl alcohol; methyl - (β - ethoxy - ethyl) phthalate, from sodium methyl phthalate and mono-chlor-ethyl ether or from mono-(β-ethoxy-ethyl) phthalate and methyl alcohol; β-acetoxy-ethyl-(β-methoxy-ethyl) phthalate, produced by acetylation of β-hydroxy-ethyl-(β - methoxy-ethyl) phthalate; β-acetoxy-ethyl-(β-ethoxy-ethyl) phthalate, produced by acetylating β-hydroxy-ethyl-(β-ethoxy-ethyl) phthalate; β-acetoxy-ethyl-(β-hydroxy-ethyl) phthalate, produced by partial hydrolysis of di-(β-acetoxy-ethyl) phthalate; and β-methoxy-ethyl-(ethyl-carboxy-methyl) phthalate, produced from the sodium salt of mono-(β-methoxy-ethyl) phthalate and ethyl chlor acetate.

Those esters are to be preferred which do not give an acid reaction even after long storage or use. Should it however appear desirable for some special purposes to make use of esters which are acid or may develop acidity, anti-acid bodies, for example tetra-methyl urea and similar alkylated amino bodies may with advantage be included in compositions containing the esters.

The invention includes the application of the new plasticizers generally in the manufacture of articles or materials comprising cellulose acetate, nitrocellulose, synthetic resins and like plasticizable substances, for example by moulding, extrusion, evaporation of solvent, coagulation by liquid media, spreading or spraying methods, and includes products, materials and compositions of matter which contain the plasticizers or in the manufacture of which the plasticizers are used, for example moulding powders, moulded or extruded articles, sheets, films, ribbons, filaments, artificial paper, artificial leather, splinterless glass, lacquers, varnishes, enamels and coating compositions generally, whether for application to fibrous or non-fibrous materials.

The new esters are of particular value when the plasticizable material comprises an organic ester of cellulose, for example an ester such as cellulose formate, propionate, butyrate and particularly cellulose acetate, or an ether such as methyl, ethyl or benzyl cellulose. The cellulose esters or ethers may be esterified or etherified to any desired degree, for instance I may employ cellulose acetates having an acetyl content lying between that of the triacetate and the diacetate, such as the esters obtainable by hydrolyzing or "ripening" a triacetate to an acetyl content in the neighbourhood of 58% combined acetic acid, or till it becomes soluble in acetone. The cellulose derivative may have any desired viscosity characteristics according to the purpose for which it is to be employed. In the production of lacquers and other coating compositions cellulose derivatives of relatively low viscosity may generally be used. Where, however, tensile strength is a desideratum in the product, it is preferable to employ esters of high viscosity. The production of such esters is described in U. S. Patent No. 1,708,787.

The products and compositions of the invention may contain natural or synthetic resins, for example shellac, dammar, phenol aldehyde resins of the soluble fusible type whether in the Novolak or Resol stage, and soluble fusible resins from other starting materials, for instance from diphenylol propane and formaldehyde or from other aldehydes, from urea or thiourea and formaldehyde, and particularly synthetic resins of the polymerized vinyl ester type, for example polymerized vinyl acetate.

Many of the compositions will naturally contain in addition to the new plasticizers and the plasticizable material volatile solvents or solvent mixtures therefor. For example, liquid compositions containing cellulose acetate may contain acetone, methyl ethyl ketone, ethyl formate, dioxane and other volatile solvents. High boiling solvents, for example cyclohexanone, ethyl lactate, diacetone alcohol, benzyl alcohol and cyclohexanol may also be present. The compositions may contain latent solvents for the cellulose derivative, for example ethyl alcohol, methyl alcohol and other aliphatic alcohols of low molecular weight, ethylene and methylene chloride and other halogenated aliphatic hydrocarbons. There may be present two or more latent solvents which together form a solvent mixture for the cellulose acetate, for example mixtures of ethyl or methyl alcohols with ethylene or methylene dichlorides. The compositions may moreover contain diluents or non-solvents for the cellulose derivative, for example benzene, toluene or any of the three xylenes, cumene, cymene or other hydrocarbons of low, medium or high boiling point. For example, coating compositions may contain in addition to plasticizable material and one or more of the new plasticizers, a low boiling solvent for the material, a medium boiling non-solvent therefor with or without additional high boiling solvents or plasticizers, for example, glycerin, triacetin, tributyl phosphate, triphenyl phosphate, tricresyl phosphate, dibutyl tartrate, triphenylol propane or a plasticizer of the sulphonamide or sulphonanilide series. Non-inflammators may also be present and these may themselves function as plasticizers, as to, for example, tri-brom acetanilide and other halogenated acidylated aromatic amines.

Solvents, latent solvents, diluents and non-solvents for the plasticizable material may be employed in the manofacture even of solid products. For example in the manufacture of filaments, ribbons and the like by evaporative processes, the dope will in general contain, in addition to the plasticizable material and a relatively small proportion of plasticizer, a relatively large proportion of a volatile solvent or solvent mixture. The solvent mixture may comprise two or more latent solvents which together form a solvent mixture, and/or may contain suitable non-solvents, provided these are not present in sufficient quantity to cause precipitation of the plasticizable material at too early a stage in the evaporation. Dopes for the production of filaments, ribbons, films and the like by the wet process may also contain such liquids, though in this case it is not of course necessary that the major part of the solvent or solvent mixture should be volatile, the essential being that a sufficient proportion of the solvent should be removable by the coagulating medium.

The plasticizers may be introduced into the product, material or composition at any convenient stage in the manufacture thereof and by any convenient means. In the case of solid products formed from liquid compositions or dopes, for example by extrusion, evaporation, coagulation by liquid media or by spreading, it may be convenient to introduce the plasticizers into the dope directly or in solution or suspension in a suitable liquid. In the manufacture of moulding powders and the products made therefrom, the plasticizer may conveniently be introduced in the process of malaxation or may be sprayed on to the cellulose derivative in the form of a solution in a volatile solvent, as described in U. S. applications S. Nos. 525,617 and 525,618, filed 26th March, 1931.

Other constituents of the products, materials or compositions may include oils, waxes, filling agents, white or coloured pigments, organic colouring agents, and/or substances adapted to produce particular effects, e. g. pearl essence and powdered metals. The materials may be subjected to after treatments with a view to changing their physical or even chemical characteristics, according to the properties required.

The following examples illustrate the invention without in any way limiting it:—

*Example 1*

100 lbs. phthalic anhydride are heated with 50 lbs. monomethyl glycol ether and a small quantity of sulphuric acid to act as a catalyst, to a temperature of 140° C. under a fractionating column by means of which the water produced in the reaction is slowly removed while the less volatile monomethyl glycol ether is returned to the reaction. The product of the reaction, mono-(β-methoxy-ethyl) phthalate, on violent shaking or "seeding" crystallizes out.

A similar reaction may be employed for the production of mono-(methoxy-β-ethoxy-ethyl) phthalate, in which the starting materials are phathalic anhydride and the monomethyl ether of diethylene glycol.

Example 2

The mono-(β-methoxy-ethyl) phthalate obtained in Example 1 may be converted into β-hydroxy-ethyl-(β-methoxy-ethyl) phthalate in the following way:—

100 lbs. of mono-(β-methoxy-ethyl) phthalate is heated in an autoclave with 60 lbs. of ethylene oxide at a temperature of 100° C. for about 9 hours. At the end of this time a further 60 lbs. of ethylene oxide is added, and the reaction continued under the same conditions for a further period of 9 hours. The product is neutralized with sufficient sodium carbonate to combine with the unchanged mono-(β-methoxy-ethyl) phthalate remaining and is then washed several times with small quantities of water. The product is then dried at a temperature of 90° C. under reduced pressure.

Example 3

Mono-(β-methoxy-ethyl) phthalate, in the form of its sodium salt, may also be converted into β-methoxy-ethyl-(β-acetoxy-ethyl) phthalate in the following way:—

60 lbs. of mono-(β-methoxy-ethyl) sodium phthalate is powdered and heated with 120 lbs. β-chlorethyl acetate under reflux until a substantially complete esterification is obtained. The reactants are then allowed to cool to about 45° C., and filtered to remove the sodium chloride formed in the reaction. The chlorethyl acetate is then removed by distillation. If desired a final purification of the β-methoxy-ethyl-(β-acetoxy-ethyl) phthalate may be effected by distillation under very low pressure.

Example 4

β-methoxy-ethyl-(β-acetoxy-ethyl) phthalate may also be prepared by acetylation of β-methoxy-ethyl-(β-hydroxy-ethyl) phthalate. The following description indicates one method whereby this may be accomplished.

Equal molecular proportions of β-methoxy-ethyl-(β-hydroxy-ethyl) phthalate and acetyl chloride are carefully mixed and the mixture cooled so as to maintain a temperature of from 25°–30° C. When substantial evolution of hydrogen chloride ceases the mixture is heated to 40° C. for about an hour and any excess acetyl chloride is destroyed by adding water. Acetic acid so formed is removed with the water by distillation, preferably under reduced pressure.

Example 5

Monomethyl sodium phthalate is heated with a molecular equivalent of ethylene chlorhydrin in an autoclave to a temperature of 140° C. for some hours. The reactants are then allowed to cool, and the methyl-(β-hydroxy-ethyl) phthalate formed is dissolved in a mixture of alcohol and ethyl acetate, separated from insoluble impurities by filtration, and finally purified by fractional distillation under reduced pressure.

Example 6

The potassium salt of mono-α-ethyl-butyl phthalate in a finely divided form is heated with β-chlordiethyl ether under reflux for 10 hours. The α-ethyl-butyl-(β-ethoxy-ethyl) phthalate formed is dissolved in a mixture of benzene and ethyl acetate, filtered from the potassium chloride formed, and recrystallized from the solvent mixture.

Example 7

β-methoxy-ethyl-(β-acetoxy-ethyl) phthalate is gently heated under reflux with from 3–5 times its weight of dilute sulphuric acid for from 2–3 hours, with the production by hydrolysis of β-methoxy-ethyl β-hydroxy-ethyl phthalate.

Example 8

A cellulose acetate plastic composition containing as plasticizer β-hydroxy-ethyl-(β-methoxy-ethyl) phthalate may be made up as follows:—

30 parts of the β-hydroxy-ethyl-(β-methoxy-ethyl) phthalate are dissolved in 120 parts of a 50:50 alcohol benzene mixture and the solution is thoroughly incorporated with 100 parts of acetone soluble cellulose acetate. The incorporation is effected by means of malaxating rollers, the solvent being removed by evaporation in the usual way. The plasticized mass thus produced may be employed for the manufacture of moulded products of any desired form.

Example 9

A composition which may be employed for the formation of lacquers or insulating coatings is:—

|  | Parts |
|---|---|
| Cellulose acetate | 60 |
| Polymerized vinyl acetate | 40 |
| β-methoxy-ethyl-(β-acetoxy-ethyl) phthalate | 35 |
| Acetone | 500 |
| Benzene | 250 |
| Alcohol | 250 |

Example 10

Another composition that is suitable for the formation of lacquers is:—

|  | Parts |
|---|---|
| Nitrocellulose | 100 |
| Diphenylol propane formaldehyde resin | 15 |
| β-ethoxy-ethyl-(β-acetoxy-ethyl) phthalate | 25 |
| Triphenyl phosphate | 10 |
| Butyl acetate | 1000 |
| Acetone | 100 |

Example 11

The following composition is very suitable for producing highly flexible films or coatings which may be used for covering rubber insulated cables or the like:—

|  | Parts |
|---|---|
| Cellulose acetate | 100 |
| Diphenylol propane formaldehyde resin | 20 |
| Dibutyl tartrate | 200 |
| Mono-α-ethyl-butyl-(β-ethoxy-ethyl) phthalate | 60 |
| Acetone | 400 |
| Dioxane | 250 |

What I claim and desire to secure by Letters Patent is:—

1. Compositions and articles containing a derivative of cellulose, selected from the group consisting of organic acid esters of cellulose, methyl cellulose, ethyl cellulose and benzyl cellulose, and an ester of a polycarboxylic acid, said ester containing groups of the formulae —COO.R$_1$OH and —COO.R$_2$OR$_3$, where R$_1$, R$_2$ and R$_3$ are saturated aliphatic hydrocarbon radicles.

2. Compositions and articles containing an organic acid ester of cellulose and an ester of a polycarboxylic acid, said ester containing groups of the formulae —COO.R$_1$OH and —COO.R$_2$OR$_3$, where R$_1$, R$_2$ and R$_3$ are saturated aliphatic hydrocarbon radicles.

3. Compositions and articles containing cellulose acetate and an ester of a polycarboxylic acid, said ester containing groups of the formulae —COO.R$_1$OH and —COO.R$_2$OR$_3$, where R$_1$, R$_2$ and R$_3$ are saturated aliphatic hydrocarbon radicles.

4. Compositions and articles containing an organic acid ester of cellulose and an ester of the formula

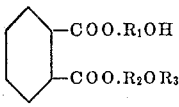

where R$_1$, R$_2$ and R$_3$ are saturated aliphatic hydrocarbon radicles.

5. Compositions and articles containing an organic acid ester of cellulose and an ester of a halogenated phthalic acid, said ester containing groups of the formulae —COO.R$_1$OH and —COO.R$_2$OR$_3$, where R$_1$, R$_2$ and R$_3$ are saturated aliphatic hydrocarbon radicles.

6. Compositions and articles containing cellulose acetate and β-hydroxyethyl β-methoxyethyl phthalate.

7. Artificial filaments and other articles having a basis of a derivative of cellulose, selected from the group consisting of organic acid esters of cellulose, methyl cellulose, ethyl cellulose and benzyl cellulose, and an ester of a polycarboxylic acid, said ester containing groups of the formulae —COO.R$_1$OH and —COO.R$_2$OR$_3$, where R$_1$, R$_2$ and R$_3$ are saturated aliphatic hydrocarbon radicles.

8. Artificial filaments and other articles having a basis of an organic acid ester of cellulose and containing an ester of a polycarboxylic acid, said ester containing groups of the formulae —COO.R$_1$OH and —COO.R$_2$OR$_3$, where R$_1$, R$_2$ and R$_3$ are saturated aliphatic hydrocarbon radicles.

9. Artificial filaments and other articles having a basis of an organic acid ester of cellulose and containing an ester of the formula

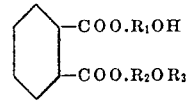

where R$_1$, R$_2$ and R$_3$ are saturated aliphatic hydrocarbon radicles.

10. Artificial filaments and other articles having a basis of an organic acid ester of cellulose and containing an ester of halogenated phthalic acid, said ester containing groups of the formulae —COO.R$_1$OH and —COO.R$_2$OR$_3$, where R$_1$, R$_2$ and R$_3$ are saturated aliphatic hydrocarbon radicles.

11. Artificial filaments and other articles having a basis of cellulose acetate and containing β-hydroxyethyl β-methoxyethyl phthalate.

HENRY DREYFUS.